April 13, 1965 K. SCHÖPS 3,178,645
CIRCUIT FOR THE PRODUCTION OF KEYED OSCILLATOR WAVES
Filed June 6, 1961
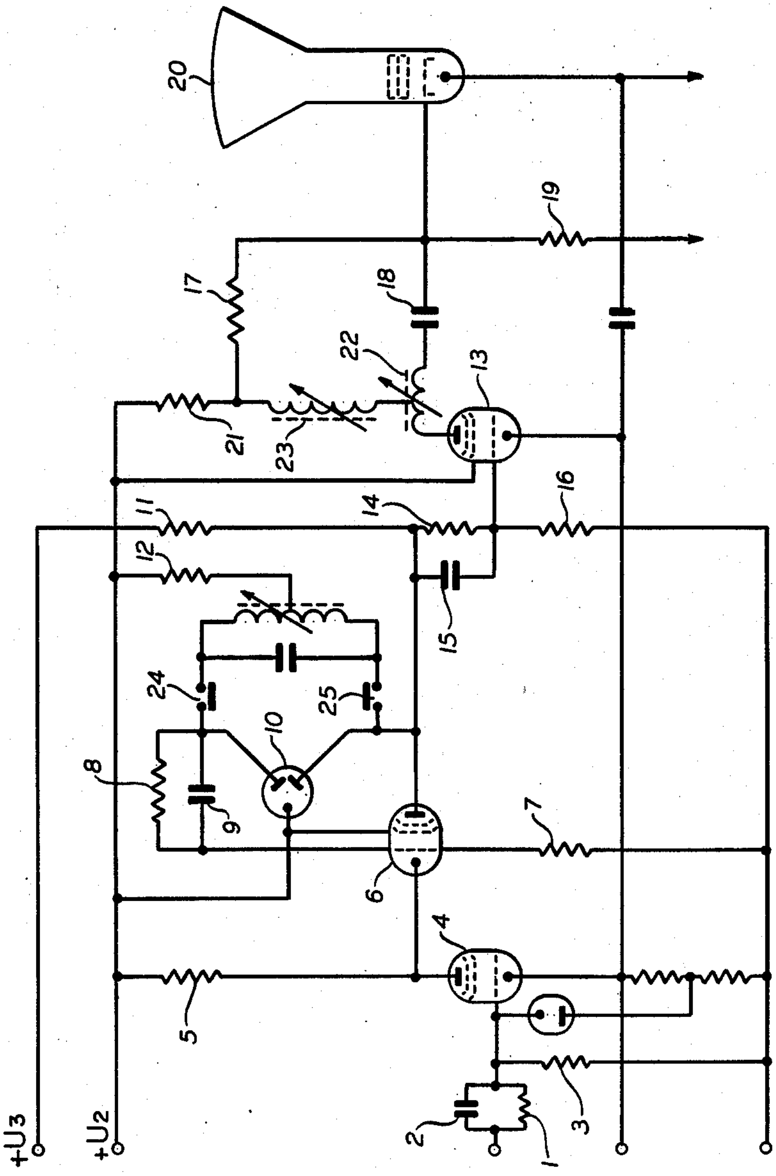
INVENTOR
KURT SCHÖPS
BY [signature]
ATTORNEY.

3,178,645
Patented Apr. 13, 1965

3,178,645
CIRCUIT FOR THE PRODUCTION OF KEYED OSCILLATOR WAVES

Kurt Schöps, Dresden, Germany, assignor to Zentralinstitut für Kernphysik, Dresden, Germany, a corporation of Germany Filed June 6, 1961, Ser. No. 115,174
2 Claims. (Cl. 328—189)

The present invention relates to a circuit for the production of keyed oscillator waves in general and of such waves of a high frequency, for instance, 1000 megacycles per second, the phase of which is permanent in relation to the leading edge of a keying pulse.

The known circuits use a great return coupling factor, in order to bring about a fast start of the oscillating waves. The oscillating energy is already present as potential energy prior to the keying. In the case of high frequencies, this principle requires high currents of considerable duration and is not economical for this reason. This problem (transforming the stored potential energy into oscillating energy immediately upon occurrence of the leading edge of the keyed pulse) limits the utility of the known circuits, as does the energy storage required for the higher oscillator frequencies due to greater current streams.

It is one object of the present invention to provide a shock excited oscillator circuit which includes means for producing keyed oscillations particularly of a high frequency (for instance 1000 mc./s.), the phase of which is permanent in a fixed relation to the leading edge of the keying pulses.

It is another object of the present invention to provide a shock excited oscillator circuit which greatly facilitates switching of the oscillator frequency.

It is a further object of the present invention to provide a shock excited oscillator circuit which includes high frequency stability.

It is yet a further object of the present invention to provide a shock excited oscillator circuit wherein the amplitude of oscillations reaches its full value within the first half period and remains constant during the entire duration of the operation, being switched off within a small portion of a period following the trailing edge of the leading pulse.

Briefly, according to the invention, the oscillation energy of an oscillator circuit is taken from the leading edge of a keying pulse which is amplified in an amplifier stage serving simultaneously as a switch for the oscillator, so that upon use, for instance, of a parallel distributing tube, which is controlled by a differentiated switching pulse, oscillations having frequencies of over 1000 mc./s. may be produced with a high stability due to a loose feed back, thereby, avoiding the drawbacks of the known circuits.

By the circuit arrangement in accordance with the present invention, the return coupling is negligible and the building or construction of, for instance, time marker generators is possible wherein exact time measurements can be performed within the nano-second range, since the full oscillator amplitude appears in the first period of the oscillation. The circuit, arranged in accordance with the present invention, requires less current and is more economical than the known circuits.

The circuit designed in accordance with the present invention combines the following characteristics and advantages:

(1) The start of the operation of the oscillator takes place with a leading edge and the stopping with a trailing edge of the keying pulses.

(2) The duration and succession of the keying pulses are not limited by the circuit; they must correspond, however, in their dimensions with the oscillator frequency.

(3) The transformation of one oscillator frequency to another takes place by a very simple switching. For instance, in case of a transformation of an oscillator frequency of 100 c./s. to 100 mc./s. only the oscillator circuit, with two switching contacts, for example, need be replaced in the total circuit.

(4) The frequency stability is very high, since circuits of high quality may be used and the return couplings factor need be only slightly larger than unity.

(5) The circuit is arranged in such manner, that the oscillator amplitude reaches its full value within the first half wave, remains constant during the total duration of the operation, and is then switched off within a small portion of an oscillator period.

(6) The retardation of the first half wave of the produced oscillator wave can be made selectively small in relation to an edge of the keying pulse.

(7) The retardations, occurring in case of less steep edges of the keyed pulse, are constant.

(8) The circuit permits the keying of very high oscillator frequencies as, for instance, 1000 mc./s.

(9) The circuit arrangement delivers, in the case of rectangular keying pulses, a corresponding starting pulse, the constant oscillator potential being disposed over said starting pulse, and the latter as well as said rectangular keying pulse being free of overswinging.

With this and other objects in view which will become apparent in the following detailed description, the present invention will be clearly understood in connection with the accompanying drawing, wherein:

The drawing illustrates the circuit, in accordance with the present invention, for the production of keyed oscillator waves as a time marking generator in a cathode ray oscillograph.

Referring now to the figure, a positive rectangular keying pulse is applied to the control grid of a switching tube 4 over a bridged potential divider, which is independent of the applied frequencies, from the deflecting device of the oscillograph. The potential divider consists of a resistor 1, a capacitor 2 and a resistor 3 as well as the starting capacitance of the tube $Ce$ (not shown), and switching tube 4. The pulse duration of the rectangular keying pulse corresponds, for instance, with the rising time period of the time deflecting potential. In order to maintain a short retarding time between the start of the time decline and the release of the time marks, the starting keying pulse must be sufficiently great and the bias of the grid of the tube 4 set in such a manner, that at the foot of the keying pulse the switching tube 4 is just cut-off and only a part of the leading edge is passed through, until the grid current limit is reached. The switching tube 4 performs two tasks in the switching arrangement according to the present invention. First, it steepens the leading edge of the keying pulse, and, second, it switches into the circuit the keyed oscillator. The steepening of the leading edge takes place in accordance with the following known principle:

During the interpulse period (between keying pulses) the switching tube 4 is cut-off. Its starting capacity $Ca$ is charged to the potential $U_2$ with the remaining switch capacities $Cs(Ca+Cs=C)$ over a resistor 5. An anode current starts to flow with the positive edge of the keying pulses, which anode current discharges $C(Ca+Cs)$. A negative pulse edge is thus created at the anode of the switching tube 4 with the steepness $i_a/C$. The anode current and, thereby, the steepness of the pulse edge is at its greatest when the grid current reaches its limit, provided, that the anode potential has not fallen below its "bend." With the switching tube 4, such great steepnesses can be achieved, that oscillator frequencies of over 100 mc./s. can be switched without any difficulties. For still higher oscillator frequencies, for instance 1000 mc./s, it is desirable to switch an additional flank steepening tube in parallel arrangement to the switching tube 4, which additional steepening tube is controlled by a differentiated starting impulse. This additional steepening tube produces a very short but much greater anode current pulse, so that by selection and operation thereof, great pulse steepnesses can be obtained.

With the thus produced steep negative anode potential pulse, an oscillator tube 6 is now switched on and keyed, respectively. Its cathode potential approaches, arriving from positive values, the grid potential secured over a potential divider. The starting point of the oscillator tube 6 is chosen by means of two resistors 7 and 8 in such a manner that the switching-on takes place with the greatest pulse steepness. The oscillator circuit is moved to an optimum by the steep switching flank, so that in the first period the full oscillator amplitude is achieved. This presumes that the duration of the leading keying pulse edge amounts to ¼ of the period of the oscillator wave.

The oscillator tube 6 operates with a relatively low return coupling factor. The circuit arrangement, designed in accordance with the present invention, complies with this optimum requirement of the present invention. In order to permit the start and suppression of the oscillator, a great oscillating amplitude in a tank circuit with little energy, the L/C relation must be correspondingly great. The oscillator circuit is therefore formed as a $\pi$-circuit, in which the unavoidable tube and switching capacities appear only slightly, due to a series arangement of the circuit capacitances, so that a favorable L/C relation results for high oscillator frequencies. Since the return coupling branch, which is formed as frequency-independent potential divider including a resistor 8, a condenser 9, the resistor 7, and the tube starting capacity C*e*, is not simultaneously switched over upon change of the oscillator frequency, a frequency transformation can be made simply by substituting a tank circuit by means of only two switching contacts, for instance, the contacts 24 and 25.

The oscillator amplitude is limited by two diodes of the tube. A current flows from $+U_3$ over a resistor 11 and the diodes of the tube 10 to $+U_2$ during the interpulse period. The diodes dampen the tank circuit, so that upon a correspondingly great L%C relation, an aperiodic limit is present. With the switching on of the oscillator, a potential drop is created on a resistor 12 which brings about the immediate blocking of the two diodes of the tube 10. The oscillator amplitude is limited to this value of the created potential drop. The diode damping is switched off automatically during the period of the keying pulse and is switched in thereafter again. It has no inertia and prevents the oscillator amplitude from setting itself with the time-constant of the usual RC-grid combination. Due to the diode limit, a curve distortion is created, which is desirable for the present example of the time marker generator.

The last stage includes a tube 13 with the following requirements:

(*a*) Transformation of a very great frequency range from $f=0$ up to, for instance, second fundamental harmonic of the highest oscillator frequency ($f=0$, due to the transforming rectangular switching pulse with very low following frequency; the second harmonic of the highest oscillator frequency in order to transfer the curve-distorted sine-wave).

(*b*) Amplification of the potential delivered from the oscillator.

(*c*) Distortion of the oscillator wave.

In order to comply with the requirement (*a*), in accordance with the present invention, capacitive overbridged, frequency independent potential dividers are provided at the start and at the end of the end step. Such potential dividers include a resistor 14, a condenser 15, a resistor 16, the starting capacity C*e* of the tube 13 and a resistor 17, a condenser 18, a resistor 19, as well as the starting capacity C*e* of the cathode ray tube 20.

Concerning the requirement (*b*), an ohmic outer resistance 21 with the provision of the necessary amplification, the steepness of the tube 13 and the deleterious capacities C*a* of the tube 13 and C*e* of the tube 20 may be adjusted. In the present example, for instance, a $\pi$-circuit is provided as a non-ohmic outer resistance for the highest oscillator frequency, which $\pi$-circuit is formed of an inductance 22, the anode capacity C*a*, the tube 13 and the starting capacity C*e* of the tube 20.

As a non-ohmic outer resistance for the second highest harmonic of the oscillator frequency, a parallel resonant circuit suffices, which circuit is formed of an inductance 23 and the above stated capacities *Ca*+*Ce*.

For the requirement (*c*), in order to obtain clean limited time marks with equal cord strength, in accordance with the present invention a one-sided distorted sine curve is formed. This distortion, which the oscillator delivers, for instance, by means of a diode limitation, can be delivered also by class C operation of the tube 13. The latter works in this case free from a grid current. In order to maintain the distortion achieved in the tube 13, it is of advantage to maintain a sufficiently small ohmic outer resistance 21 in view of the damaging capacities. For highest oscillator frequencies, it is suitable to tune the parallel resonant circuit and the $\pi$-circuit as much as possible to the second fundamental harmonic or, if the required amplification permits, to the fourth fundamental harmonic of the oscillator frequency. It should also be mentioned that in accordance with the present invention a resistance combination may be switched on between the switching contacts 24 and 25 and the potential $U_2$, instead of an oscillator circuit, if the oscillograph should operate, for instance, without time marks.

While I have disclosed one embodiment of the present invention, it is to be understood that this embodiment is given by example only and not in a limiting sense, the scope of the present invention being determined by the objects and the claims.

I claim:

1. A shock excited oscillator circuit for generating keyed oscillations of a high frequency, the phase of said oscillations being in a permanent fixed relation to the leading edge of applied positive keying pulses, comprising a switching tube including a plate, said tube being controlled by said keying pulses for amplifying said pulses and steepening their leading edges, a voltage divider including a portion bridged by a capacitor, an oscillator tube including a plate, a control grid and a cathode, said cathode being coupled to the plate of said switching tube, a resonant tank circuit including an inductance having a pair of terminals and a center tap, one terminal of said inductance being connected to the plate of said oscillator tube and the other terminal of said inductance being connected by means of said voltage divider to the control grid of said oscillator tube, said voltage divider enabling a substantially frequency independent feed back, a first resistor and a second resistor, two diodes including cathode means and plates for damping oscillations within said tank aperiodically during the intervals between the keying pulses and for limiting the oscillations to a fixed value during the pulse, said diode plates being connected to respective terminals of said inductance, said diode cathode means being connected to a first positive voltage, said inductance center tap being connected through said first resistor to said positive voltage, and a second more positive voltage connected by way of said second resistor to said one terminal of said inductance.

2. In combination, a cathode ray tube and a shock excited oscillator circuit for generating keyed oscillations of a high frequency, the phase of said oscillations being in a permanent fixed relation to the leading edge of applied positive keying pulses, said oscillator circuit comprising a switching tube including a plate, said tube being controlled by said keying pulses for amplifying said pulses and steepening their leading edges, a voltage divider including a portion bridged by a capacitor, an oscillator tube including a plate, a control grid and a cathode, said cathode being coupled to the plate of said switching tube, a resonant tank circuit including an inductance having a pair of terminals and a center tap, one terminal of said inductance being connected to the plate of said oscillator tube and the other terminal of said inductance being connected by means of said voltage divider to the control grid of said oscillator tube, said voltage divider enabling a substantially frequency independent feed back, a first resistor and a second resistor, two diodes including cathode means and plates for damping oscillations within said tank aperiodically during the intervals between the keying pulses and for limiting the oscillations to a fixed value during the pulse, said diode plates being connected to respective terminals of said inductance, said diode cathode means being connected to a first positive voltage, said inductance tap being connected through said first resistor to said positive voltage, and a second more positive voltage connected by way of said second resistor to said one terminal of said inductance; a class C amplifier connected between the plate of said oscillator tube and said cathode ray tube; a second inductance having two terminals and a center tap, one terminal of said second inductance being connected to the output of said class C amplifier, the other terminal of said second inductance being connected to the input of said cathode ray tube whereby said second inductance forms a tank circuit with the output and input capacitances of said class C amplifier and cathode ray tube, respectively; and a third inductance having two terminals, one of said third inductance terminals being connected to said second inductance center tap, the other of said third inductance terminals being connected to a source of positive voltage whereby said third inductance forms a third tank circuit with said input and output capacitances.

References Cited in the file of this patent

UNITED STATES PATENTS

| | | |
|---|---|---|
| 2,576,652 | Sziklai et al. | Nov. 27, 1951 |
| 2,610,294 | Seddon | Sept. 9, 1952 |
| 2,671,173 | Gamertsfelder | Mar. 2, 1954 |
| 2,760,075 | Parker et al. | Aug. 21, 1956 |